(12) United States Patent
Ham et al.

(10) Patent No.: US 7,679,704 B2
(45) Date of Patent: Mar. 16, 2010

(54) METHOD OF FABRICATING AN IN-PLANE SWITCHING MODE LIQUID CRYSTAL DISPLAY COMPRISING RUBBING AND APPLYING A BEAM TO SET PRE-TILT ANGLES

(75) Inventors: Yong Sung Ham, Anyang-si (KR); Mi Sook Nam, Suwon-si (KR); Su Hyun Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 480 days.

(21) Appl. No.: 11/156,651

(22) Filed: Jun. 21, 2005

(65) Prior Publication Data

US 2006/0001813 A1    Jan. 5, 2006

(30) Foreign Application Priority Data

Jun. 30, 2004    (KR) .................. 10-2004-0050547

(51) Int. Cl.
  *G02F 1/1337*    (2006.01)
  *G02F 1/1343*    (2006.01)
(52) U.S. Cl. ...................................... 349/124; 349/141
(58) Field of Classification Search .............. 349/141, 349/123–126, 136, 132, 134
  See application file for complete search history.

(56) References Cited

U.S. PATENT DOCUMENTS

| | | | | |
|---|---|---|---|---|
| 5,731,405 A | * | 3/1998 | Gibbons et al. | 528/353 |
| 5,764,326 A | * | 6/1998 | Hasegawa et al. | 349/124 |
| 5,793,459 A | * | 8/1998 | Toko | 349/128 |
| 5,817,743 A | * | 10/1998 | Gibbons et al. | 528/353 |
| 5,991,001 A | * | 11/1999 | Park | 349/191 |
| 6,124,914 A | * | 9/2000 | Chaudhari et al. | 349/129 |
| 7,253,859 B2 | * | 8/2007 | Ishizaki | 349/117 |
| 2002/0041352 A1 | * | 4/2002 | Kuzuhara et al. | 349/117 |
| 2002/0057412 A1 | * | 5/2002 | Ashizawa et al. | 349/143 |
| 2005/0046771 A1 | * | 3/2005 | Lee et al. | 349/126 |

FOREIGN PATENT DOCUMENTS

| | | |
|---|---|---|
| JP | 10-062802 | 3/1998 |
| JP | 2001-281671 | 10/2001 |
| KR | 1998-42231 | 8/1998 |
| KR | 1998-51988 | 9/1998 |
| KR | 2002-11054 | 2/2002 |
| KR | 2003-33833 | 5/2003 |

* cited by examiner

*Primary Examiner*—Andrew Schechter
*Assistant Examiner*—Charles Chang
(74) *Attorney, Agent, or Firm*—McKenna Long & Aldridge LLP

(57) ABSTRACT

An IPS (in-plane switching mode) liquid crystal display device and fabricating method thereof, in which post treatment lowering the pre-tilt angle is performed on a rubbed alignment layer on a substrate using a non-rubbing method such as UV or ion-beam irradiation, and by which a viewing angle characteristic is enhanced. The present invention includes a first substrate, a second substrate, a gate line and a data line crossing with each other on the first substrate to define a pixel area, a thin film transistor at a crossing of the gate and data lines, a pixel electrode and a common electrode alternately arranged in the pixel area a predetermined interval from each other, an alignment layer over the pixel and common electrodes having a pre-tilt angle equal to or smaller than about 1°, and a liquid crystal layer between the first and second substrates.

4 Claims, 9 Drawing Sheets

METHOD OF FABRICATING AN IN-PLANE SWITCHING MODE LIQUID CRYSTAL DISPLAY COMPRISING RUBBING AND APPLYING A BEAM TO SET PRE-TILT ANGLES

This application claims the benefit of the Korean Application No. 2004-50547 filed on Jun. 30, 2004, which is hereby incorporated by reference for all purposes as if fully set forth herein.

BACKGROUND OF THE INVENTION

1. Field of the Invention

The present invention relates to a liquid crystal display device. More particularly, the present invention relates to an IPS (in-plane switching mode) liquid crystal display device and fabricating method thereof.

2. Discussion of the Related Art

Generally, cathode ray tubes (hereinafter abbreviated CRTs) have been the most popular of the various display devices that display image information on a screen. Yet, CRTs have a considerable amount of volume and weight per unit display area, thereby resulting in CRTs being inconvenient for use.

Display devices, which have been used in a limited capacity for TV and the like, are now being employed in personal computers, notebook computers, vehicle instrument boards, and electronic advertisement boards and the like. As massive volumes of data containing image information is enabled to be transferred due to the development of information communication technology, a next generation display device enabling implementation of processing the image information becomes more important.

Such a next generation display device needs to have light-weight, slimness, shortness, smallness, high luminance, wide screen, low power consumption and low price. Hence, a liquid crystal display device is an example of one of the next generation display devices.

Display resolution of the liquid crystal display (LCD) is better than that of any other flat panel display devices. In implementing moving pictures, the LCD has a response speed characteristic as fast as that of CRT.

As one of the popular LCDs, there is a TN (twisted nematic) mode LCD. In the TN mode LCD, electrodes are provided to a pair of substrates, respectively, a liquid crystal director is aligned to be twisted by 90°, and a voltage is applied to the electrodes to drive the liquid crystal director.

Yet, it is disadvantageous that the TN mode LCD has a narrow viewing angle.

To solve the problem of the narrow viewing angle, many efforts have been made to research and develop LCD devices employing various new modes. For example, there are IPS (in-plane switching mode), OCB (optically compensated birefringence mode) and the like.

In the IPS LCD, in order to drive liquid crystal molecules maintaining a horizontal state to a substrate, a voltage is applied between a pair of electrodes formed on the same substrate to generate an electric field in a direction horizontal to the substrate. Namely, a long axis of the liquid crystal molecule is not erected against the substrate.

Hence, the variation of the birefringence of liquid crystals for a viewing direction is small to have a viewing angle characteristic better than that of the related art TN LCD.

An IPS LCD device according to a related art is explained in detail with reference to the attached drawings as follows.

FIG. 1A and FIG. 1B are cross-sectional diagrams of an IPS LCD device according to a related art, in which operations in off/on states are shown, respectively.

In FIG. 1A, since a horizontal electric field is not applied in the off-state, there is no motion of a liquid crystal layer 211.

In FIG. 1B, alignment of liquid crystals in an on-state with voltage impression is shown. There is no phase change of a liquid crystal 211$a$ at a position confronting a common electrode 217 or a pixel electrode 230. Yet, another liquid crystal 211$b$ situated between the common electrode 217 and the pixel electrode 230 is aligned by a horizontal electric field K generated from voltage impression between the common and pixel electrodes 217 and 230 in the same direction of the horizontal electric field K.

Namely, in the IPS LCD, a viewing angle is widened due to the liquid crystals moved by the horizontal electric field.

FIG. 2 is a flowchart of a method of fabricating an IPS LCD device according to a related art.

In FIG. 2, upper and lower substrates of an IPS LCD device are prepared (S100).

Subsequently, a cleaning process S110 is carried out to remove particles on the substrates having various patterns formed thereon. An alignment layer printing process S120 for printing polyimide (PI), i.e., an alignment layer raw material liquid on an upper surface of the substrate is then carried out using an alignment layer printing instrument.

Next, an alignment layer plasticizing process S130 for hardening the alignment layer raw material liquid in a manner of heating to dry solvent of the alignment layer raw material liquid is carried out.

Subsequently, an alignment layer rubbing process S140 is carried out using a rubbing machine to form recesses by rubbing a surface of the plasticized alignment layer surface in a uniform direction.

After completion of the alignment layer forming process, a seal pattern is formed on an edge of the upper substrate except a liquid crystal inlet. And, spacers are scattered on the lower substrate (S150).

Subsequently, the upper and lower substrates are bonded to each other (S160). In doing so, since light leakage occurs in case of failing in meeting a specific margin, precision of several micrometers (μm) is needed.

A cell cutting process is then carried out to cut the bonded substrates into unit cells (S170). The cell cutting process, which is to cut the completely bonded substrates into the unit cells having a specific size each, consists of a scribing process for forming lines on surfaces of the upper and lower substrates and a breaking process for cutting the substrates by impacting the scribed lines.

Finally, liquid crystals are injected in a gap between the substrates cut into each of the unit cells and the liquid crystal inlet is then sealed to prevent the liquid crystals from leaking out (S180). Thus, the LCD device is completed.

In this case, physical properties of liquid crystals are changed according to molecule alignment state, whereby a difference in a response to an external force such as an electric field and the like takes place.

Because of the above-explained properties of liquid crystal molecules, alignment control of liquid crystal molecules is essential to a configuration of the LCD device as well as study of liquid crystal physical property.

Specifically, the rubbing process for aligning liquid crystal molecules uniformly in a uniform direction plays an important role in driving the LCD normally and deciding uniform display characteristics of a screen. Hence, many efforts have been made to research and study the rubbing process.

A process of forming an alignment layer to decide an initial alignment direction of liquid crystal molecules according to a related art is explained in detail as follows.

First of all, formation of an alignment layer is carried out in a manner of coating a polymer film and aligning an alignment layer in a uniform direction.

A polyimide-based organic substance is mainly used as the alignment layer, and the alignment layer is aligned by a rubbing method.

The rubbing method is carried out in a manner of coating a polyimide-based organic substance on a substrate, removing a solvent at 60~80° C., hardening the organic substance at 80~200° C. to form a polyimide alignment layer, and then rubbing the alignment layer in a uniform direction using a rubbing cloth of velvet and the like.

Such a rubbing method facilitates alignment treatment to be suitable for mass production and to guarantee stable alignment.

Yet, such a rubbing method may result in a failure of rubbing in case of performing rubbing using a roller having a defective rubbing cloth thereto.

Namely, since a rubbing method using a rubbing cloth is carried out through a direct contact between an alignment layer and the rubbing cloth, various problems such as contamination of liquid crystal cells due to particles, breakage of TFT devices previously formed on a substrate due to static electricity, necessity of additional cleaning after rubbing, non-uniformity of alignment in wide area application and the like take place to lower yield of LCD fabrication.

Moreover, unlike the TN LCD, the IPS LCD needs a small pre-tilt angle. The reason is explained as follows.

Since the IPS LCD has a smaller retardation variation according to a gray level in all viewing angles rather than the TN LCD, a viewing angle of the IPS LCD is enhanced. Yet, in case of a small pre-tilt angle, asymmetry of the viewing angle occurs in the IPS LCD.

However, if the alignment layer is formed by performing the rubbing treatment on the generally used alignment layer of polyimide and the like, the pre-tilt angle becomes high. And, it is unable to secure alignment stability of liquid crystals. Moreover, asymmetry of the viewing angle occurs.

SUMMARY OF THE INVENTION

Accordingly, the present invention is directed to an IPS (in-plane switching mode) liquid crystal display device and fabricating method thereof that substantially obviate one or more problems due to limitations and disadvantages of the related art.

An advantage of the present invention is to provide an IPS (in-plane switching mode) liquid crystal display device and fabricating method thereof, in which post treatment is performed on a rubbing-treated alignment layer on a substrate using a non-rubbing method such as UV or ion-beam irradiation, by which a pre-tilt angle of the alignment layer is lowered, and by which a viewing angle characteristic is enhanced.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, an in-plane switching mode liquid crystal display device according to the present invention includes a first substrate, a second substrate, a gate line and a data line crossing with each other on the first substrate to define a pixel area, a thin film transistor at a crossing of the gate and data lines, a pixel electrode and a common electrode arranged in an alternating pattern in the pixel area and having a predetermined interval from each other, an alignment layer over the pixel and common electrodes having a pre-tilt angle equal to or smaller than about 1°, and a liquid crystal layer between the first and second substrates.

In another aspect of the present invention, a method of fabricating an in-plane switching mode liquid crystal display device includes forming a gate line and a common line on a first substrate in a substantially horizontal direction a predetermined interval from each other, forming a data line on the first substrate in a direction substantially vertical to the gate line, forming a plurality of common electrodes substantially parallel to the data line and forming a plurality of pixel electrodes substantially parallel to the common electrodes, the common and pixel electrodes being arrayed in an alternating pattern, forming a first alignment layer on the first substrate including the pixel electrode, performing a primary alignment treatment on the first alignment layer by rubbing, performing a secondary alignment treatment on an entire surface of the rubbed first alignment layer by applying a beam having a predetermined energy, forming a color filter layer and a black matrix on a second substrate opposite the first substrate, forming a second alignment layer on the second substrate, performing the primary alignment treatment on the second alignment layer by the rubbing, performing the secondary alignment treatment on an entire surface of the rubbed second alignment layer by applying the beam having the predetermined energy thereto, and forming a liquid crystal layer between the first and second substrates.

In another aspect of the present invention, a method of fabricating an in-plane switching mode liquid crystal display device includes forming a first substrate provided with a thin film transistor and a plurality of pixel electrodes, forming a second substrate provided with a black matrix and a color filter layer opposite the first substrate, forming an alignment layer on each of the first and second substrates, sequentially performing primary and secondary alignment treatments on each of the first and second substrates, bonding the first and second substrates together, and providing liquid crystals between the bonded first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1A:
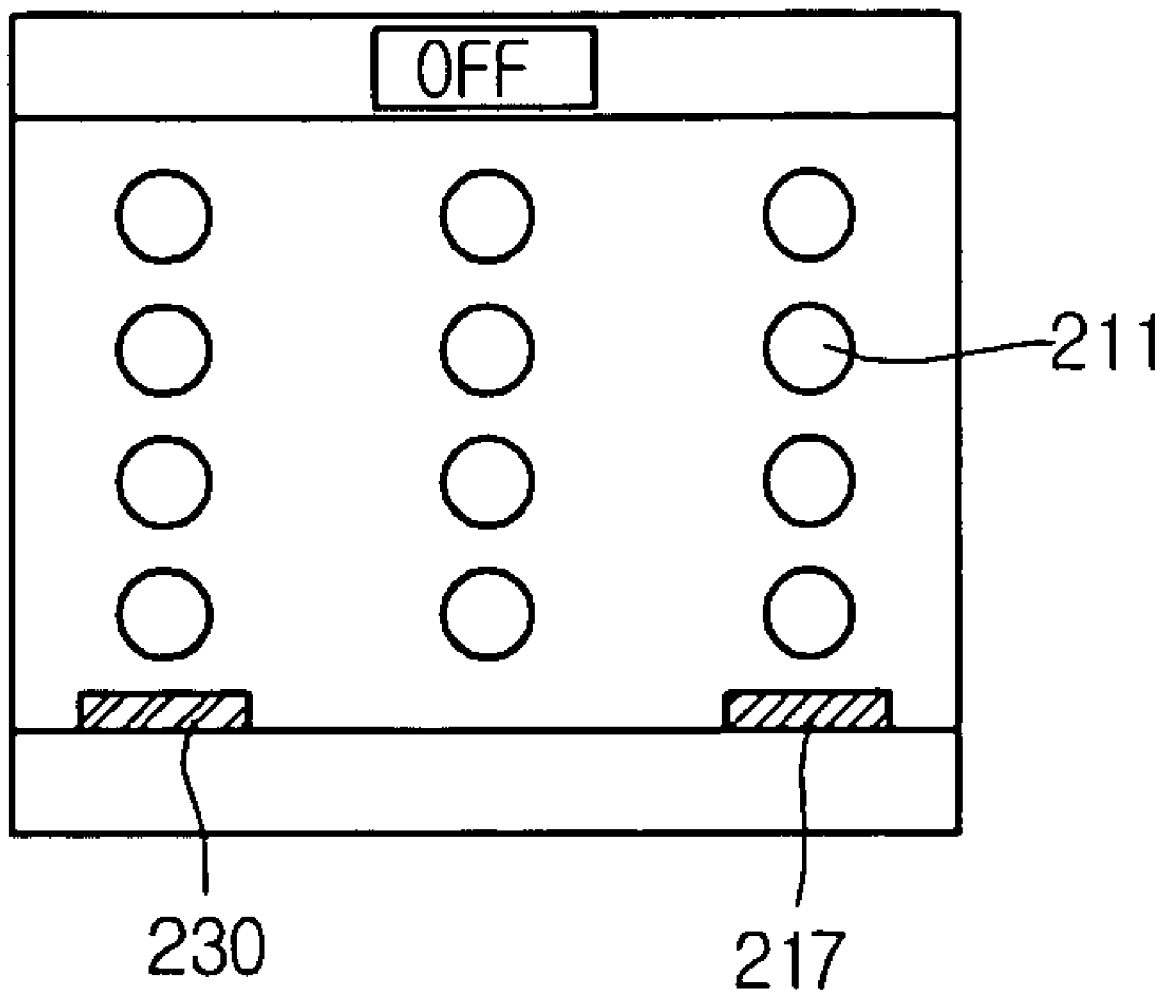
FIG. 1A and FIG. 1B are cross-sectional diagrams of an IPS LCD device according to the related art, in which operations in off/on states are shown, respectively.
Figure 1B:
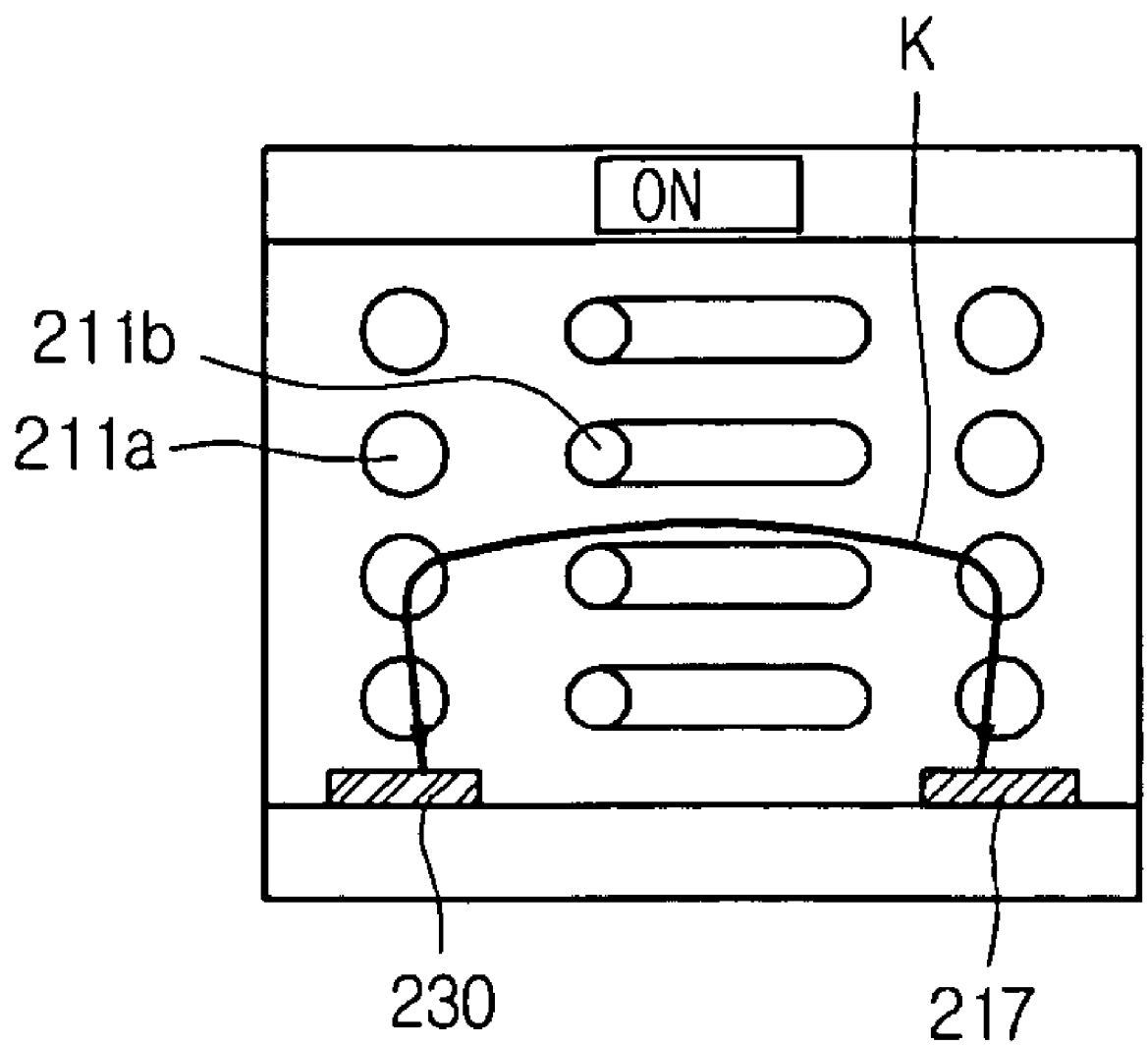
Figure 2:
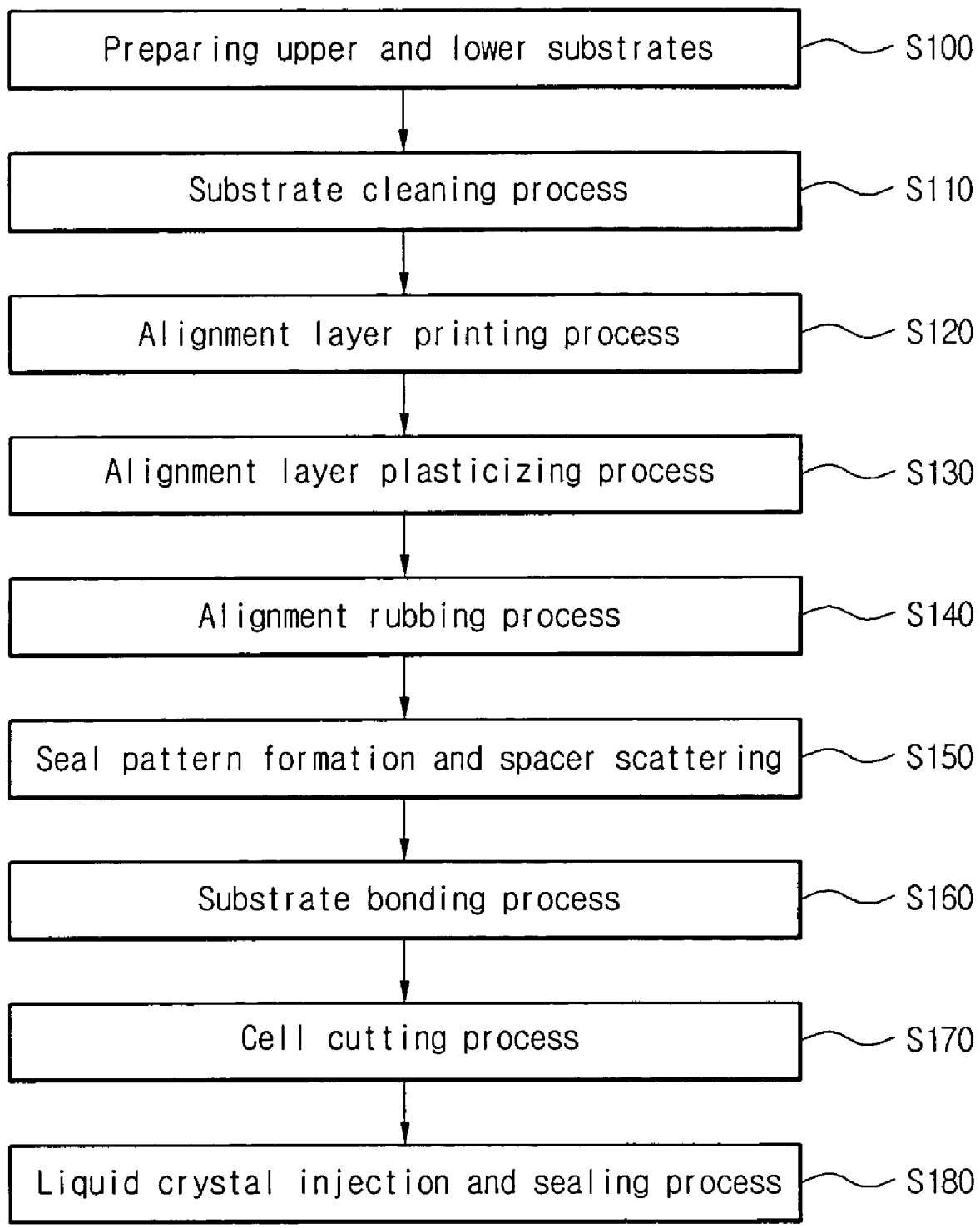
FIG. 2 is a flowchart of a method of fabricating an IPS LCD device according to a related art.
Figure 3:
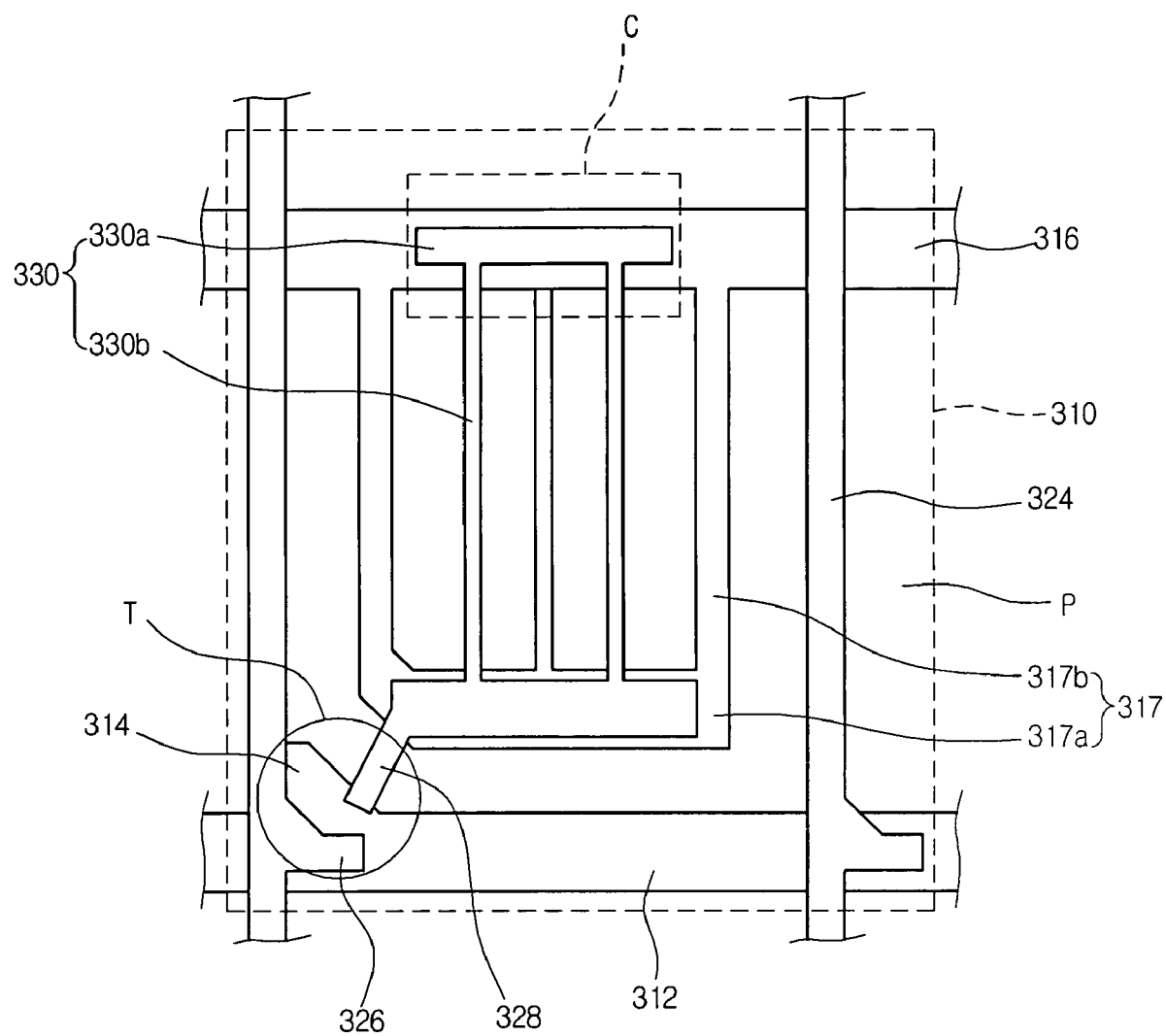
FIG. 3 is a layout of an array substrate of an IPS LCD according to the present invention.

FIG. 3 is a layout of an array substrate of an IPS LCD according to the present invention, and FIGS. 4A to 4E are cross-sectional diagrams of a method of fabricating an IPS LCD device according to the present invention.

In FIG. 3, an array substrate 310 for an IPS LCD device according to the present invention includes a plurality of gate lines 312 traversing in one direction a predetermined distance from each other, a common line 316 traversing in the vicinity of the gate line 312 in one direction substantially parallel to the gate line 312, and a data line 324 crossing the gate and common lines 312 and 316 to define a pixel area P.

A thin film transistor T including a gate electrode 314, a semiconductor layer (327 in FIG. 4A), a source electrode 326 and a drain electrode 328 is formed at the crossing of the gate and data lines 312 and 324. The source electrode 326 is connected to the data line 324, and the gate electrode 314 is connected to the gate line 312.

Over the pixel area P formed are a pixel electrode 330 connected to the drain electrode 328 and a common electrode 317 connected to the common line 316 substantially in parallel to the pixel electrode 330.

The pixel electrode 330 includes a plurality of vertical portions 330b extending from the drain electrode 328 substantially parallel to the data line 324 predetermined interval from each other and a horizontal portion 330a located over the common line 316 to connect a plurality of the vertical portions 330b together.

The common electrode 317 includes a plurality of vertical portions 317b vertically extending from the common line 316 arranged in an alternating pattern substantially parallel to the vertical portions 330b of the pixel electrode 330 and a horizontal portion 317a connecting a plurality of the vertical portions 317b together.

In this case, the horizontal portion 330a of the pixel electrode 330 is located over a portion of the horizontal portion 317a of the common line 316 with gate insulating layer (319 in FIG. 4A) in-between, thereby forming a storage capacitor C together with the common line 316.

Alternatively, each of the data line 324, the pixel electrode 330 and the common electrode 317 can be bent at least once to form a zigzag structure.

A method of fabricating the above-configured IPS LCD device according to the present invention is explained as follows.

Figure 4A:
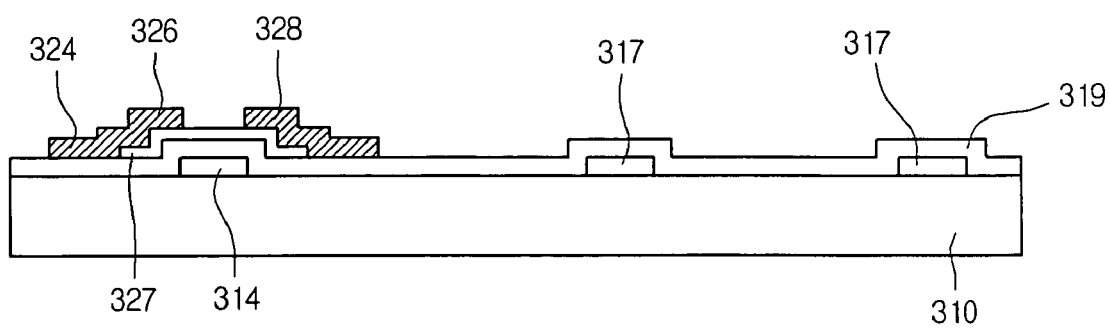
FIGS. 4A to 4E are cross-sectional diagrams of a method of fabricating an IPS LCD device according to the present invention.

In FIG. 4A, metal of low specific resistance is deposited on an array substrate 310 to prevent a signal delay. The deposited metal is patterned by photolithography to form a gate line (312 in FIG. 3) and a gate electrode 314 of a thin film transistor extending from the gate line 312.

In this case, the metal of low specific resistance includes for example, Cu, Al, Al alloy (AlNd), Mo, Cr, Ti, Ta, Mo—W or the like.

In forming the gate line 312 and the gate electrode 314, a common line (316 in FIG. 3) substantially parallel to the gate line 312 and a plurality of common electrodes 317 extending from the common line 316 are simultaneously formed.

Subsequently, an inorganic insulating substance such as silicon nitride ($SiN_x$), silicon oxide ($SiO_x$) and the like is deposited on an entire surface including the gate line 312 by PECVD (plasma enhanced chemical vapor deposition) to form a gate insulating layer 319.

Amorphous silicon or the like is deposited on the gate insulating layer 319 and is then selectively removed to form a semiconductor layer 327 having an island shape on the gate insulating layer 319 over the gate electrode 314.

Optionally, an ohmic contact layer can be further formed by implanting impurity ions into the amorphous silicon to pattern.

Figure 4B:
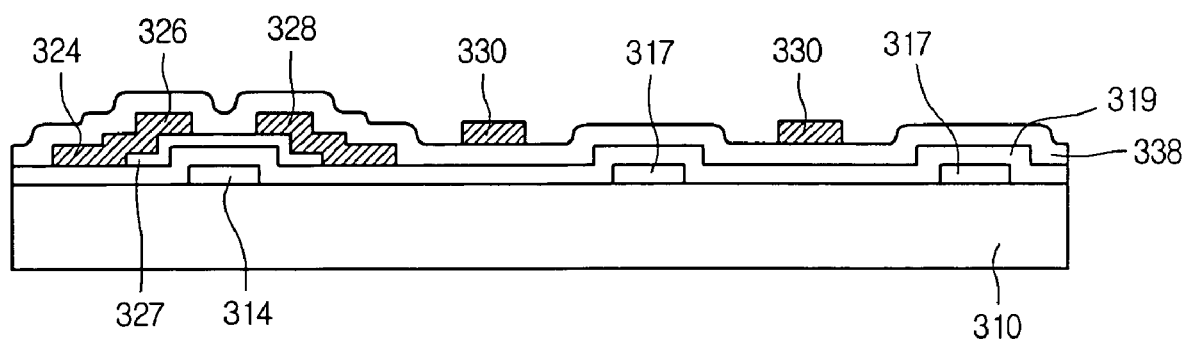

In FIG. 4B, metal such as Cr, Al, Cu, Mo, Ti, Ta, MoW, Al alloy or the like is deposited on the gate insulating layer 319. The deposited metal is then patterned by photolithography to form a data line 324 vertically crossing with the gate line 312 to define a pixel area, and simultaneously, to form source and drain electrodes 326 and 328 provided at both ends of the semiconductor layer 327, respectively.

Subsequently, a silicon nitride layer or an organic insulating layer of BBC (benzocyclobutine) may be coated on an entire surface of the array substrate 310 including the data line 324 to form a protective layer 338. And, a contact hole (not shown in the drawing) is then formed to expose the drain electrode 328.

A transparent conductive layer is deposited and patterned over an entire surface of the substrate using a transparent conductive substance of ITO (indium tin oxide) or IZO (indium zinc oxide) to form a plurality of pixel electrodes 330. In this case, a plurality of the pixel electrodes 330 are connected to the drain electrode 328 and run substantially parallel to the data line 324 to be alternately arranged between the common electrodes 317.

In a case of forming the pixel electrodes 330 of metal, the pixel electrodes 330 can be simultaneously formed of the same substance of the data line 324 prior to forming the protective layer 338.

Figure 4C:
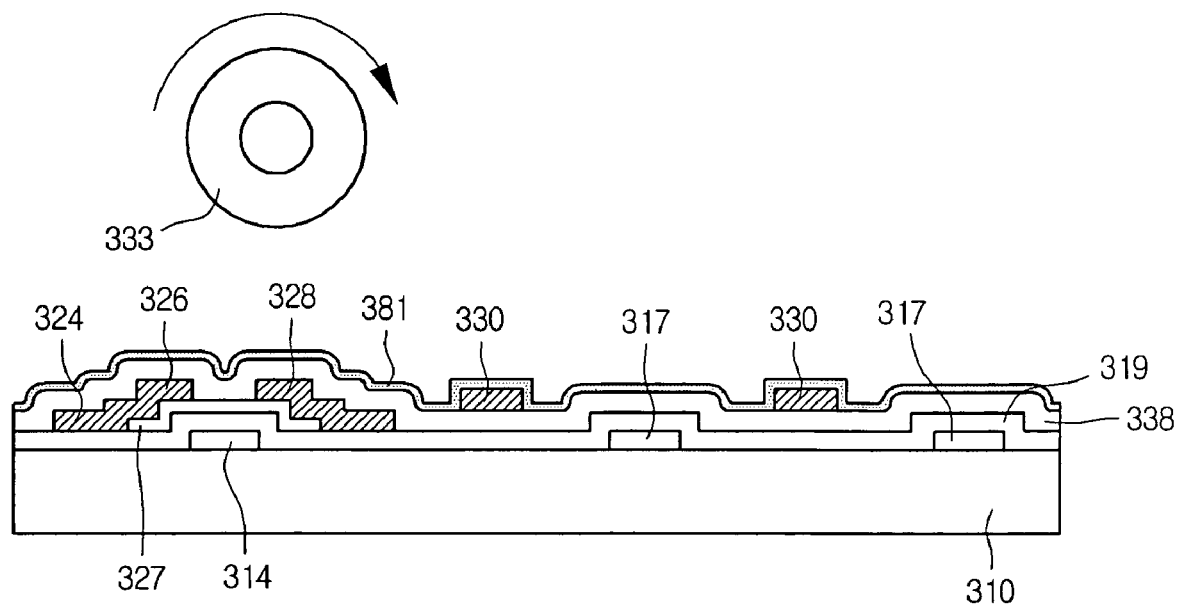

In FIG. 4C, polyimide resin having high thermal resistance and good liquid crystal affinity is printed on an entire surface of the substrate including the pixel electrodes 330. And, the printed resin is dried to form a first alignment layer 381. Primary alignment treatment is then carried out on the first alignment layer 381 by rubbing.

Figure 4D:
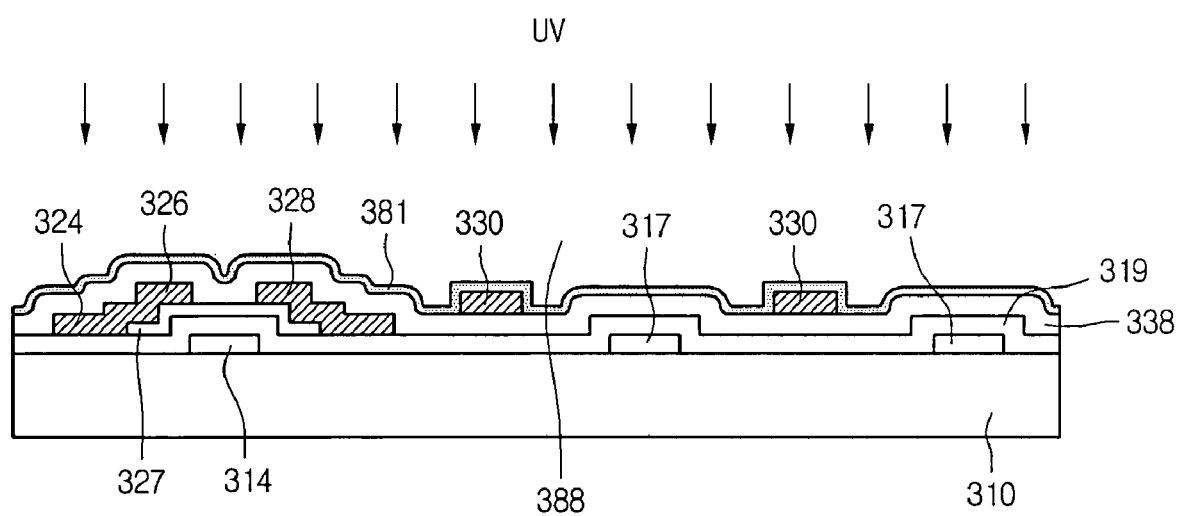

In FIG. 4D, light or ion-beam irradiation as a secondary alignment treatment is carried out on the first alignment layer 381 through the primary alignment treatment.

Specifically, the primary alignment treatment is a rubbing method for forming an alignment direction in a manner of rubbing the first alignment layer 381 of polyimide in one direction using a rubbing cloth 333 of velvet, rayon, nylon or the like.

And, the secondary alignment treatment is carried out on the rubbed first alignment layer 381 by light or ion-beam irradiation.

The light can be selected from the group consisting of linearly polarized light, partially polarized light and non-polarized light.

A wavelength of the light lies within a range of about 200~450 nm and light irradiation energy is set equal to or greater than about 0.5 $J/cm^2$.

And, the light can be irradiated by tilted irradiation or vertical irradiation.

Moreover, argon ions are used for the ion beam.

A machine for irradiating the ion beam or light is for example, a full irradiation machine of applying ions or light to an entire surface of substrate or a scan type machine for scanning a substrate for irradiation.

By performing the secondary alignment treatment such as light or ion-beam irradiation on the first alignment layer 381 through the primary alignment treatment, a pre-tilt angle below about 1° can be stably secured to enhance symmetry of a viewing angle according to a direction in the IPS LCD device. Hence, a viewing angle characteristic is enhanced as well.

Figure 4E:
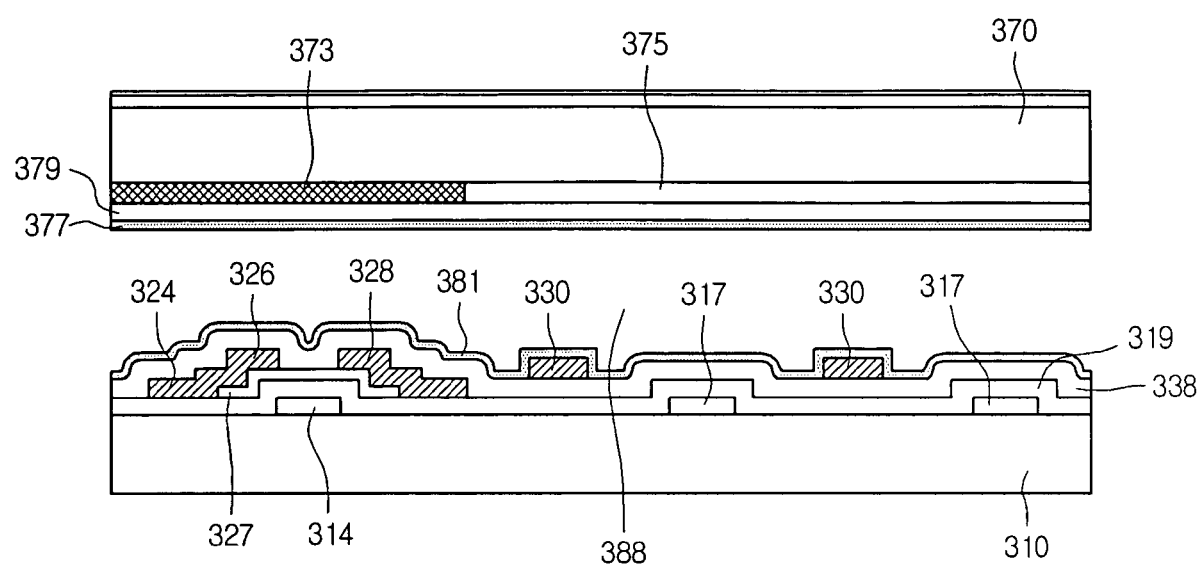

In FIG. 4E, to prevent light leakage from portions unable to control liquid crystals such as gate lines, data lines and thin film transistors, a black matrix 373 is formed on a color filter substrate 370 using highly reflective metal such as Cr, Cr oxide ($CrO_x$) and the like or black resin.

Thereafter, a color filter layer 375 of red, green and blue for color implementation is formed between the black matrixes 373 by, for example, electrodeposition, pigment dispersion, coating, etc. Optionally, an overcoat layer 379 can be formed on an entire surface including the color filter layer 375 to protect the color filter layer 375.

Subsequently, a polyimide-based substance having good affinity with liquid crystals and good photosensitivity is printed on the overcoat layer 379 to form a second alignment layer 377. Secondary alignment treatment is then performed by the same rubbing method for the alignment treatment of the first alignment layer 381 on the second alignment layer to set an alignment direction of the second alignment layer 377 to be vertical to that of the first alignment layer 381.

Afterwards, column spacers (not shown in the drawing) are formed on the array substrate 310 or the color filter substrate 370, a liquid crystal layer 388 is formed on a display area of the array or color filter substrate 310 or 370 by liquid crystal injection or liquid crystal dropping. A sealant is formed on an edge of the array or color filter substrate 310 or 370 to bond the array and color filter substrates 310 and 370 to each other in a vacuum state.

As explained in the above description, the primary alignment treatment is carried out on the first and second alignment layers 381 and 377 formed on the array and color filter substrates 310 and 370, respectively by rubbing and the secondary alignment treatment is then carried out then by light or ion beam irradiation. This is to secure symmetry of the viewing angle characteristics according to the direction of the IPS LCD device in a manner of setting the pre-tilt angle of the alignment layer to be equal to or smaller than 1°, which is shown in the simulation result of FIG. 5.

Figure 5:
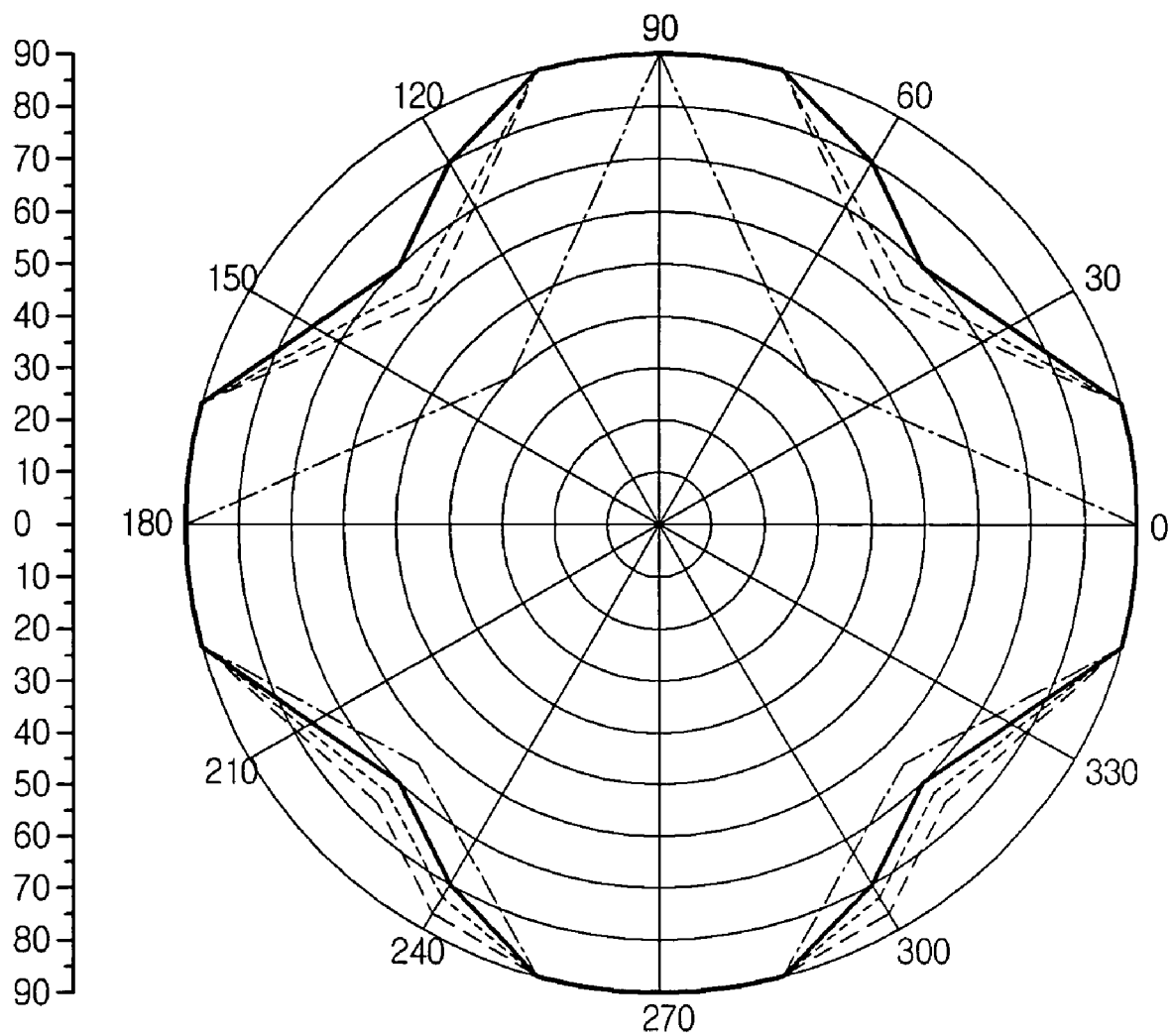
FIG. 5 is a diagram of an angle simulation according to a pre-tilt angle in an IPS LCD.

FIG. 5 is a diagram of an angle simulation according to a pre-tilt angle in an IPS LCD.

In FIG. 5, an electrode in an IPS LCD device has a zigzag pattern. After a cell gap and an electrode configuration have been uniformly set a pre-tilt angle of an alignment layer is varied between about 0°~5° in an area having contrast equal to or greater than about 10 to simulate symmetry of a viewing angle according to a direction.

In the IPS LCD device having the zigzag electrode pattern, symmetry becomes excellent at the pre-tilt angle equal to or smaller than about 1°.

To secure the symmetry of the viewing angle, the pre-tilt angle of the alignment layer should be set equal to or smaller than about 1°. For this, the primary alignment treatment is carried out on the alignment layer to set the pre-tilt angle to about 1.5°~5.0°.

Subsequently, the secondary alignment treatment is carried out on the alignment layer having the pre-tilt angle by light or ion-beam irradiation to set the pre-tilt angle to be equal to or smaller than about 1°.

In doing so, light is applied to an entire surface of the primary-alignment-treated alignment layer with light energy equal to or smaller than about 2 $J/cm^2$.

And, linearly polarized light, partially polarized light or non-polarized light can be used as the light. Specifically, in a case of using the non-polarized light, an expensive polarizing system instrument is unnecessary.

Alternatively, a plasma beam, electron beam and the like can be used instead of the light.

Figure 6:
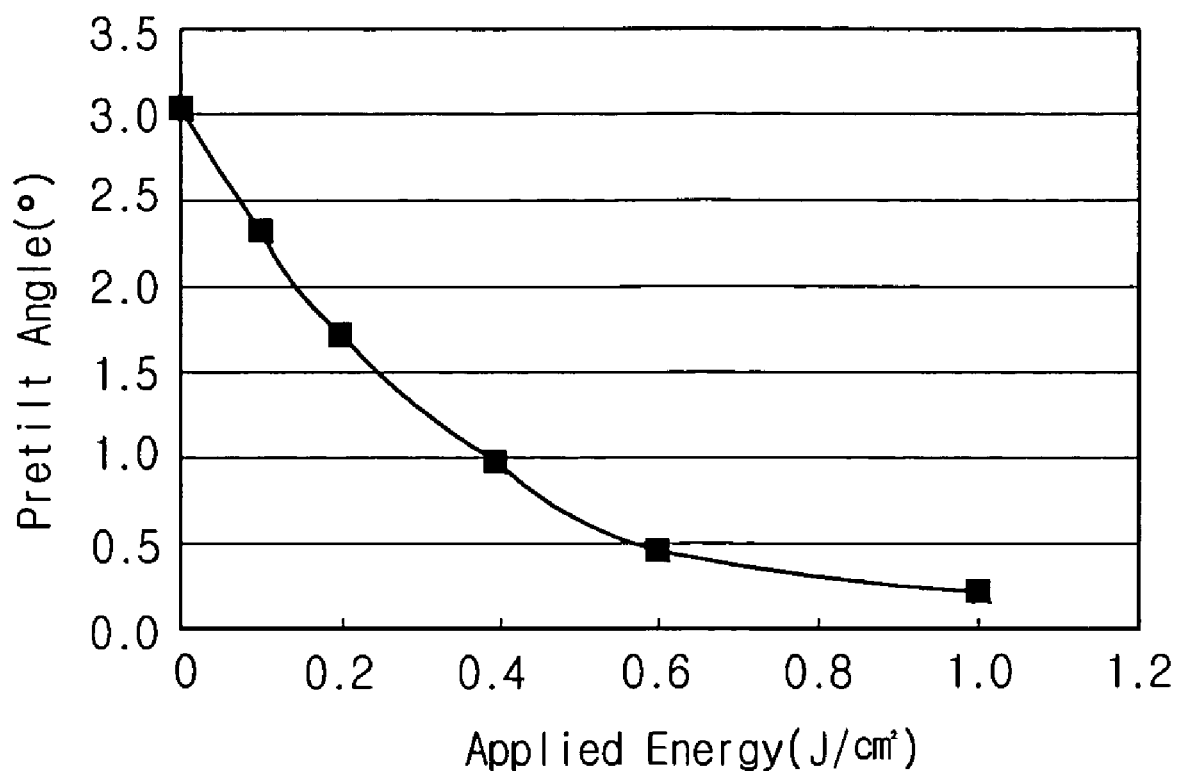
FIG. 6 is a diagram for explaining a pre-tilt angle varying according to UV energy applied to an alignment layer rubbed by a primary alignment process.

FIG. 6 is a diagram for explaining a pre-tilt angle varying according to UV energy applied to an alignment layer rubbed by a primary alignment process.

In FIG. 6, the pre-tilt angle is lowered according to an increment of an irradiated beam (IV) energy quantity. The pre-tilt angle of about 2.5° formed by the alignment layer rubbing treatment is lowered by 1° by the irradiated beam energy of about 0.5 $J/cm^2$. If the beam is irradiated with energy that is too high, the alignment treatment itself is damaged. Hence, the irradiated beam energy is set to about 2 $J/cm^2$ or less.

Accordingly, the IPS LCD device according to the present invention can be fabricated by a simple pattering process using printing.

And, the present invention can enhance the viewing angle characteristic in a manner of lowering the pre-tilt angle of the alignment layer by performing light or ion-beam irradiation on the entire surface of the rubbed alignment layer.

Moreover, the present invention uses, for example, non-polarized light in applying the light or ion-beam to the rubbed alignment layer to secure a specific pre-tilt angle without a separate polarizing instrument, thereby lowering production costs.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of fabricating an in-plane switching mode liquid crystal display device, comprising:

forming a gate line and a common line on a first substrate in a substantially horizontal direction a predetermined interval from each other;

forming a data line on the first substrate in a direction substantially vertical to the gate line;

forming a plurality of common electrodes substantially parallel to the data line and forming a plurality of pixel electrodes substantially parallel to the common electrodes, the common and pixel electrodes being arranged in an alternating pattern;

forming a first alignment layer on the first substrate including the pixel electrode;

performing a primary alignment treatment on the first alignment layer by rubbing to set a pre-tilt angle to about 1.5°~5.0°;

performing the secondary alignment treatment on an entire surface of the rubbed first alignment layer by applying a beam having a predetermined energy to set a same pre-tilt angle to about below 1° within the entire surface of the rubbed first alignment layer forming a color filter layer and a black matrix on a second substrate opposite the first substrate;

forming a second alignment layer on the second substrate;

performing the primary alignment treatment on the second alignment layer by the rubbing to set a pre-tilt angle to about 1.5°~5.0°;

performing the secondary alignment treatment on an entire surface of the rubbed second alignment layer by applying a beam having a predetermined energy to set a same pre-tilt angle to about below 1° within the entire surface of the rubbed second alignment layer; and forming a liquid crystal layer between the first and second substrates, wherein an alignment direction of the second alignment layer is set to be vertical to that of the first alignment layer, wherein the predetermined energy has a range of 0.5 to 2 J/cm$^2$, wherein the beam is applied with the same energy on the entire surface of the rubbed first alignment layer, and wherein the beam is applied with the same energy on the entire surface of the rubbed second alignment layer.

2. The method of claim 1, wherein in the performing the secondary alignment treatment, the beam having the predetermined energy is selected from a group consisting of linearly polarized light, partially polarized light and non-polarized light.

3. The method of claim 1, wherein in the performing secondary alignment treatment, the beam having the predetermined energy is selected from a group consisting of an ion beam, a plasma beam and an electron beam.

4. The method of claim 1, wherein the beam is orthogonally or obliquely applied to each of the first and second substrates.

* * * * *